United States Patent
Bablumyan et al.

(10) Patent No.: US 12,259,686 B2
(45) Date of Patent: Mar. 25, 2025

(54) WAVEGUIDE GEOMETRY FOR IMPROVED DISPLAY PERFORMANCE

(71) Applicant: A9.com, Inc., Palo Alto, CA (US)

(72) Inventors: Arkady Bablumyan, Tucson, AZ (US); Chen Liang, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 17/327,519

(22) Filed: May 21, 2021

(65) Prior Publication Data

US 2022/0373971 A1   Nov. 24, 2022

(51) Int. Cl.
  *G02B 27/01*   (2006.01)
  *G02B 5/32*    (2006.01)
  *G03H 1/26*    (2006.01)

(52) U.S. Cl.
  CPC .............. *G03H 1/26* (2013.01); *G02B 5/32* (2013.01); *G03H 2223/16* (2013.01); *G03H 2270/32* (2013.01)

(58) Field of Classification Search
  CPC .. G03H 1/26; G03H 2223/16; G03H 2207/32; G02B 5/32; G02B 27/1006; G02B 27/0172
  USPC ............................................. 359/34, 15, 569
  See application file for complete search history.

(56) References Cited

U.S. PATENT DOCUMENTS

| | | |
|---|---|---|
| 6,906,836 B2 | 6/2005 | Parker et al. |
| 8,233,204 B1 | 7/2012 | Robbins et al. |
| 9,513,480 B2 | 12/2016 | Saarikko et al. |
| 11,709,363 B1 * | 7/2023 | Eash ................. G02B 6/0038 385/37 |
| 2009/0245730 A1 | 10/2009 | Kleemann |
| 2009/0303212 A1 | 12/2009 | Akutsu et al. |

(Continued)

FOREIGN PATENT DOCUMENTS

| WO | WO2016020643 A1 | 2/2016 |
| WO | WO2017180403 A1 | 10/2017 |
| WO | WO2018209108 A2 | 11/2018 |

OTHER PUBLICATIONS

Shen, Zhongwen, "Characterization and Optimization of Field of View in a Holographic Waveguide Display," IIEEE Photonics Journal, vol. 9, No. 6, Dec. 2017.

(Continued)

*Primary Examiner* — Audrey Y Chang
(74) *Attorney, Agent, or Firm* — Kilpatrick Townsend & Stockton LLP (57) ABSTRACT

The present invention features new waveguide layouts for input, redirection (expansion), and output holograms that minimize cross talk between colors and allow all three colors to reside in a single waveguide. The use of multiple incoupling holograms that diffract different colors of light in different directions, or along different paths, through a waveguide substrate advantageously provides for a reduction of cross-talk between the colors of a holographic image. In a square-shaped design, red, green, and blue input and output holograms approximately overlay on top of each other. The green redirection hologram is laterally separated from the red and blue redirection holograms. Using this square-shape design, the light beams for the three colors are separated into two paths propagating from input to output holograms.

20 Claims, 8 Drawing Sheets

(56) References Cited

U.S. PATENT DOCUMENTS

| | | | |
|---|---|---|---|
| 2011/0019258 A1* | 1/2011 | Levola | G02B 27/0081 |
| | | | 359/238 |
| 2012/0033306 A1 | 2/2012 | Valera et al. | |
| 2015/0016777 A1 | 1/2015 | Abovitz et al. | |
| 2015/0293358 A1 | 10/2015 | de Matos Pereira Vieira et al. | |
| 2016/0116739 A1* | 4/2016 | TeKolste | G02B 6/0025 |
| 2016/0124229 A1 | 5/2016 | Yokoyama | |
| 2017/0276948 A1 | 9/2017 | Welch et al. | |
| 2017/0363871 A1* | 12/2017 | Vallius | G02B 6/0016 |
| 2018/0188540 A1* | 7/2018 | Kimmel | G02B 5/1866 |
| 2019/0011708 A1* | 1/2019 | Schultz | G02B 6/34 |
| 2019/0310482 A1* | 10/2019 | Schultz | G02B 5/04 |
| 2020/0225498 A1* | 7/2020 | Potnis | G02B 5/1866 |
| 2020/0400955 A1* | 12/2020 | Messer | G06F 3/017 |

OTHER PUBLICATIONS

Piao, Jing-Ai, " Full Color Holographic Optical Element Fabrication for Waveguide-type Head Mounted Display Using Photopolymer," Journal of the Optical Society of Korea, vol. 17, No. 3, Jun. 2013, pp. 242-248.

Guo, Jingjing, "Design of a multiplexing grating for color holographic waveguide," SPIE, Optical Engineering 54(12) 125105, Dec. 2015.

Barden et al, "vol. Phase Holographic Gratings and the Efficiency of Three Simple Volume-Phase Holographic Gratings," Publications of the Astronomical Society of the Pacific, 112:809-820,Jun. 2000.

Zhou et al., "See-through near-eye displays enabling vision correction," Optical Society of America, Jan. 25, 2017.

Bigler et al., "Holographic Waveguide HUD with in-line pupil expansion and 2D FOV expansion" Optical Society of America, 2019.

Close, D.H., Holographic Optical Elements, Optical Engineering, vol. 14, No. 5, Sep.-Oct. 9, 1975.

Augmented Reality Module (AR Module), Product Brief, WaveOptics, 2018.

Hunsperger, R.G., "Optical Waveguide Modes," Integrated Optics, DOI 10.1 007/b98730 2, Springer Science +Business Media, LLC 2009.

Wang et al., "Optical Design of Waveguide Holographic Binocular Display for Machine Vision," Applied Mechanics and Materials ISSN: 1662-7482, vols. 427-429, pp. 763-769, Sep. 27, 2013.

Guo et al., "Holographic waveguide display with a combined-grating in-coupler," Optical Society of America, Nov. 9, 2016.

* cited by examiner

WAVEGUIDE GEOMETRY FOR IMPROVED DISPLAY PERFORMANCE

BACKGROUND OF THE INVENTION

Field of the Invention

This invention relates to waveguide image combiners for combining real imagery and auxiliary content to generate an augmented reality display.

Background Art

Image projection through a waveguide via total internal reflectance (TIR) is an especially elegant way to build augmented reality (AR) devices like HUD, car display on its windshield, NED on glasses, etc. Such devices generally require (1) an element to couple an image into the waveguide, (2) an element for pupil expanding to provide a reasonable observation area for the viewer, and (3) an element to couple the image out of the waveguide toward the viewer. There are multiple techniques to build these elements, but using diffractive elements such as surface relief gratings (SRG) or volume holograms (Bragg grating) offers advantages such as compactness and lower cost of production.

Figure 1:
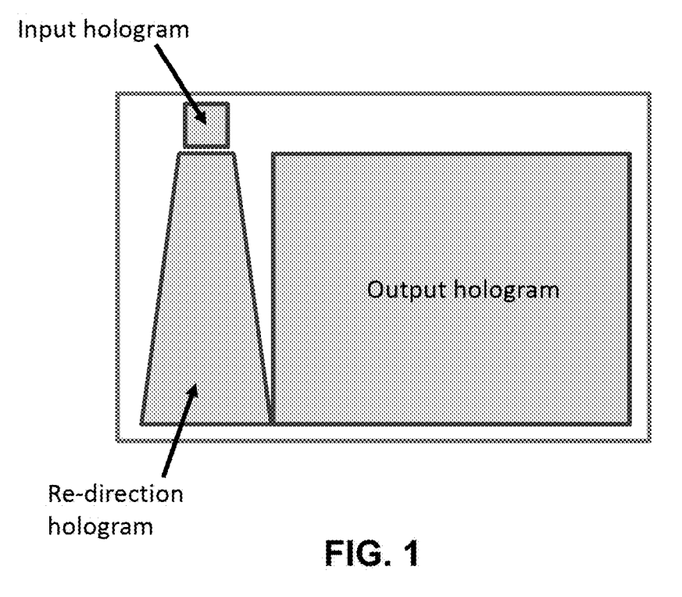
FIG. 1 shows an illustration of an optical waveguide with input, pupil expansion (redirection), and output elements arranged in a waveguide with an L-shape geometry.

There are multiple possible ways to arrange the input, pupil expansion, and output elements on a waveguide. One of the common ways the input, pupil expansion, and output elements are arranged in a waveguide is with the L-shape geometry shown in FIG. 1, where the output element is located diagonally from the input element and the pupil expander is located adjacent to both input and output elements. In this geometry, the one-dimensional pupil expander redirects the beam from the input element 90 degrees toward the output element, and it is often referred to as redirection grating or hologram if a diffractive element is used.

Figure 2:
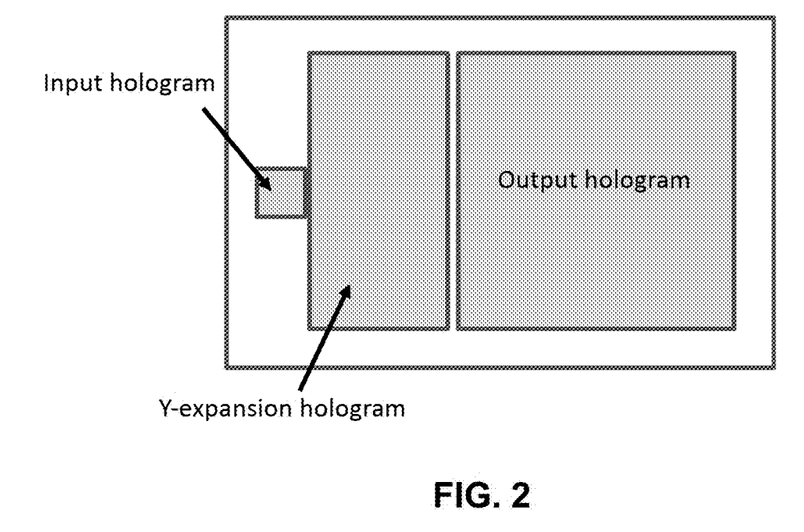
FIG. 2 shows an illustration of an optical waveguide with input, pupil expansion, and output elements arranged in a waveguide with an in-line geometry.

Another way to arrange the input, pupil expansion, and output elements on a waveguide is the in-line geometry shown in FIG. 2. In this design, the input, pupil expansion, and output elements are arranged in a straight line. The pupil expansion element replicates and expands the pupil in the vertical direction and the output element expands the pupil in the horizontal direction. For input and output elements, if diffractive elements are used, they are often referred to as input and output gratings or holograms.

Limitations of Existing Designs

For AR applications the waveguide typically needs to operate in full color. To optimize performance, the light for three colors (red, green, and blue, or RGB) can be handled by separate holograms specifically designed for those specific colors. In this case, there will be three input holograms and three redirection or expansion holograms and three output holograms. The three holograms can be recorded on one layer of photopolymer or other holographic film or they can be recorded on two or three layers of films.

Figure 3:
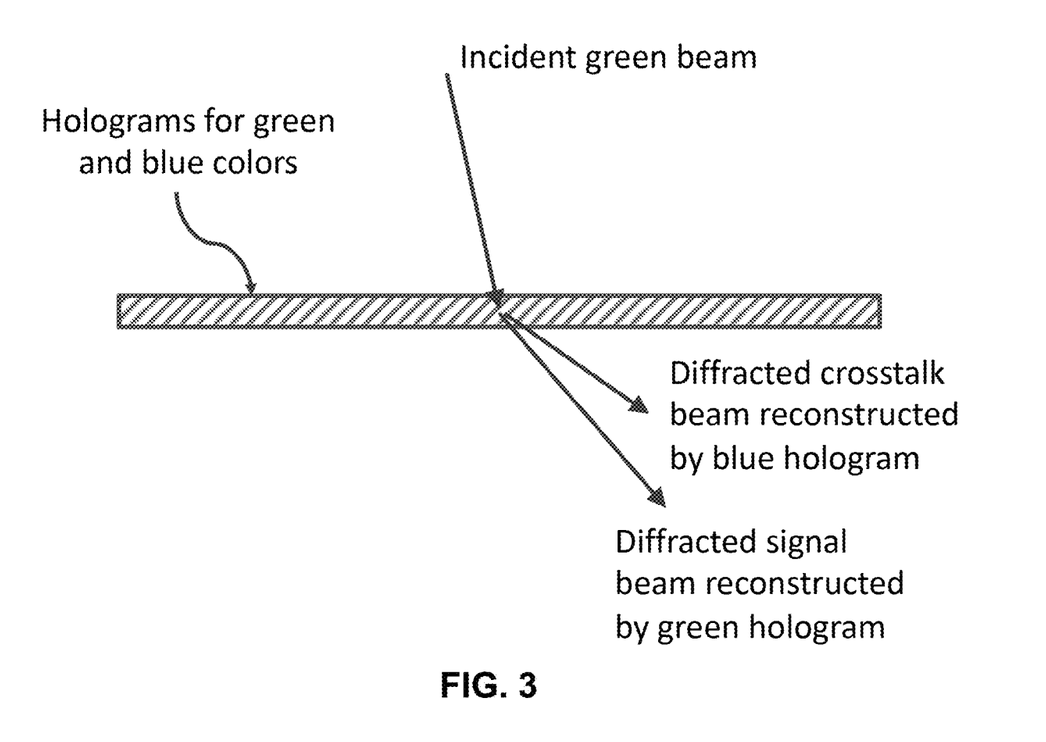
FIG. 3 shows a schematic illustration of the interactions between an incident beam and multiple holograms to generate both a desired signal beam and an undesired crosstalk beam.

One problem with both the L-shape and the in-line waveguide designs is that the image quality may be degraded due to cross talk between the different colors. For example if the holograms for different colors are overlaid on top of each other, with the same orientation, and optically coupled with the same waveguide, then cross talk may degrade the image quality. Ideally, when an incident light of a specific color interacts with multiple holograms stacked on top of each other, and each designed for a different color, it should only be diffracted by the one hologram that is designed to diffract this specific color light. However, this is not always the case, depending on the design parameters of the holograms and the wavelength separation between the colors. FIG. 3 shows the case where incident blue light may get diffracted by both the blue and the green hologram and produce a signal beam and a crosstalk beam. Typically, the cross-talk beam is diffracted with less diffraction efficiency and at different angles. The severity of the cross-talk depends on the spectral separation between the colors. The commonly used wavelength for red is about 640 nm. The commonly used wavelength for green is about 515 nm-532 nm. The commonly used wavelength for blue is about 450 nm-460 nm. The spectral separation between green and blue is approximately 55 nm-82 nm and between green and red is approximately 108 nm-125 nm. Therefore, the cross talk is more serious between neighboring colors such as between blue and green than between blue and red. The spectral separation between the red and blue colors are large enough where the interaction between the red color light with blue holograms and vice versa is generally minimal.

One solution which reduces the cross-talk problem is to place the green color holograms in separate waveguides that are optically isolated from the red and blue colors. The two waveguides may be separated by a small air gap or a low-index medium. The downside of this solution is the increased number of waveguides. Two waveguides needed for full color (RGB), which increases the overall thickness and complexity of the device.

BRIEF SUMMARY OF THE INVENTION

It is an objective of the present invention to provide systems and devices that allow for reduction of cross talk between light of different colors propagating through the waveguide, as specified in the independent claims. Embodiments of the invention are given in the dependent claims. Embodiments of the present invention can be freely combined with each other if they are not mutually exclusive.

Figure 4:
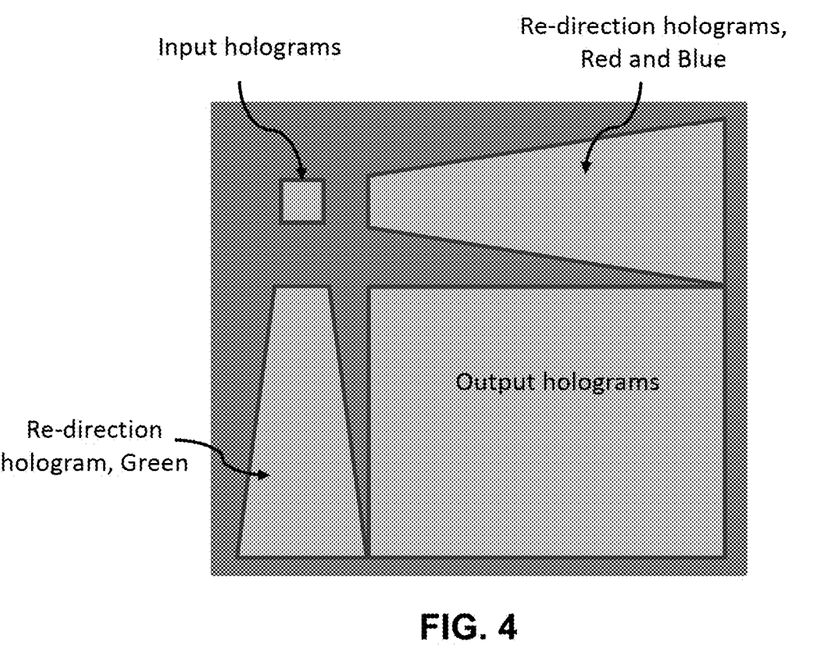
FIG. 4 shows a schematic illustration of an optical waveguide of the present invention, with input, pupil expansion (redirection), and output elements arranged in a waveguide with a square geometry, such that the redirection holograms are disposed along adjacent sides of a rectangular output holograms.

The present invention features new waveguide layouts for input, redirection (expansion), and output holograms that minimize cross talk between colors and allow all three colors to reside in one waveguide. One proposed new layout is shown in FIG. 4 and is referred to as the square-shape design. The red, green, and blue input and output holograms approximately overlay on top of each other in similar positions as in the L-shape design. The green redirection hologram is laterally separated from the red and blue redirection holograms in the plane of the waveguide, where the green redirection hologram is along one side of the output holograms that is adjacent to both the input and output holograms while the red and blue redirection holograms are along the other side of the output holograms that is adjacent to both the input and output holograms. The output holograms for all three colors are approximately overlapping. The redirection hologram replicates and expands the pupils in one direction and the output hologram replicates and expands the pupils in the orthogonal direction.

Figure 5:
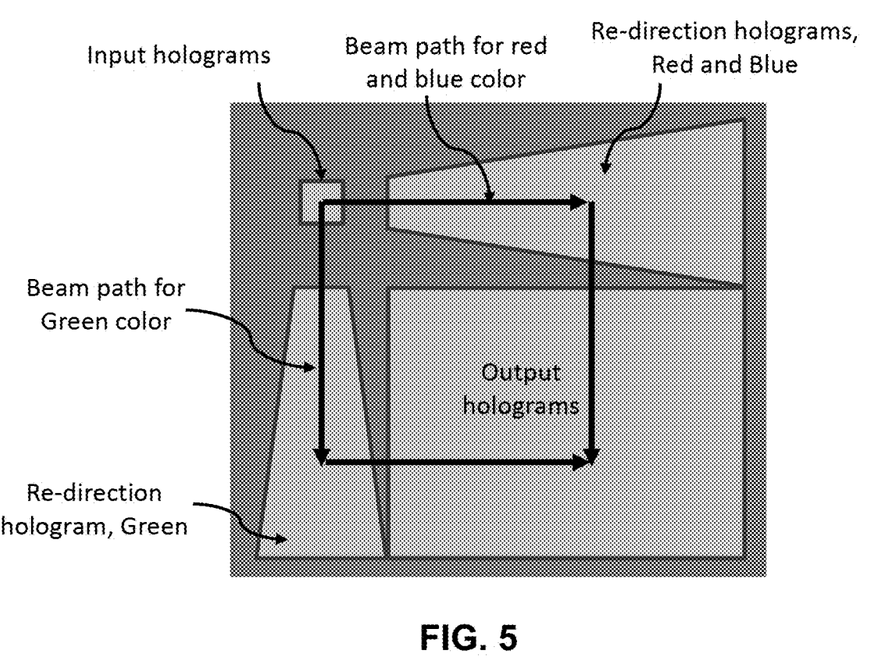
FIG. 5 shows a schematic illustration of the beam paths through an optical waveguide of the present invention, where the green color is directed vertically from the green input hologram and redirected horizontally to the green output hologram, while the red and blue colors are directed horizontally from their respective input holograms and redirected vertically to their corresponding output holograms.

Using this square-shape design, the light beams for the three colors are separated into two paths propagating from input to output holograms. The green color follows the first path where the green input hologram diffracts the incident green light toward the green redirection hologram along a first direction (vertical) and the green redirection hologram diffracts the green light toward the toward the green output hologram along the second direction (horizontal) where the green light is outcoupled toward the viewer. The red and blue colors follow the second path where the input red and blue holograms diffract the incident red and blue light toward the red and blue redirection holograms along the second direction (horizontal) and the red and blue redirection holograms diffract the red and blue light toward the red and blue output holograms along the first direction (vertical) where the red and blue light are outcoupled toward the viewer. The two beam paths are shown in FIG. 5.

One of the unique and inventive technical features of the present invention is the use of multiple incoupling holograms that diffract different colors of light in different directions or along different paths through a waveguide substrate. Without wishing to limit the invention to any theory or mechanism, it is believed that the technical feature of the present invention advantageously provides for a reduction of cross-talk between the colors of a holographic image. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which.

DETAILED DESCRIPTION OF THE INVENTION

In one embodiment, the present invention features an optical waveguide for combining light from real imagery with light from a light engine. As a non-limiting example, the waveguide may be part of a near-to-eye (NTE) display. In some embodiments, the waveguide may include an optically transparent substrate having top and bottom surfaces; and a plurality of optical elements optically coupled with the substrate. As a non-limiting example, the plurality of optical elements may include: a plurality of incoupling optical elements, each configured to incouple a light beam into the substrate such that the light beam propagates through the substrate along a primary beam path; a plurality of overlapping outcoupling optical elements, each configured to outcouple one of the light beams from the substrate; and one or more redirection optical elements, each configured to redirect one of the light beams such that it propagates through the substrate toward the outcoupling optical elements along a secondary beam path. In preferred embodiments, at least two of the primary beam paths are different from each other. In selected embodiments the incoupling, outcoupling, and redirection optical elements may be arranged in a square-shaped geometry.

Two Color (Green and Blue) Cross-Talk Example for L-Shape Geometry

Figure 6A:
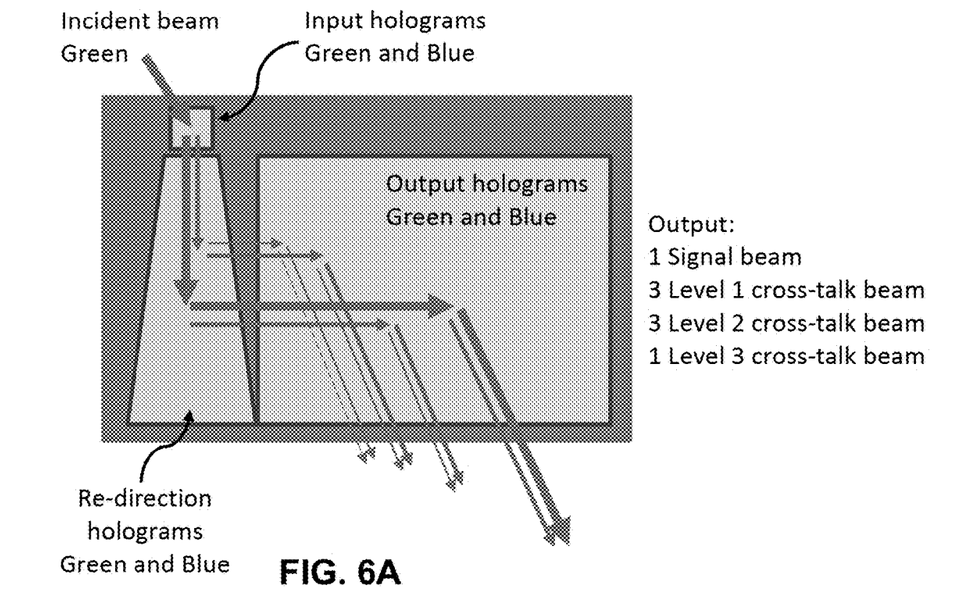
FIG. 6A shows a schematic illustration of the various cross-talk beams formed by a two-color optical waveguide with an L-shape geometry, due to the geometric overlap of the various optical elements.

To better understand how the square-shape design reduces cross-talk compared to the L-shape design, we can consider a simple example using only two colors, blue and green, since the spectral separation between them is smaller. As shown in FIG. 6A, for a waveguide with an L-shape design, when the incident green light beam interacts with the input holograms, (one green and one blue input holograms) it will be diffracted into two beams, one from each hologram. The beam diffracted by the green input hologram is the desired beam, or "signal beam," and the beam diffracted by the blue input hologram is the cross-talk beam, or more specifically, a "level 1 cross-talk beam."

When those two beams interact with the redirection holograms (one green and one blue redirection holograms) each in turn diffracts into two beams and results in four beams exiting the redirection holograms. The four beams consist of one signal beam, two level 1 cross-talk beams, and 1 level 2 cross-talk beam. The level 2 cross-talk beam is the result of the green incident beam diffracted by both the blue input hologram and blue redirection hologram.

When the four beams from the redirection holograms interact with the output holograms (one green and one blue hologram) each again diffracts into two beams to result in eight beams exiting the output holograms. The eight beams consist of one signal beam, three level 1 cross talk beams, three level 2 cross-talk beams, and one level 3 cross-talk beam. The level 3 cross-talk beam is the result of the green incident beam diffracted by the blue input, redirection, and output holograms.

Two Color (Green and Blue) Cross-Talk Example for Square-Shape Geometry

Figure 6B:
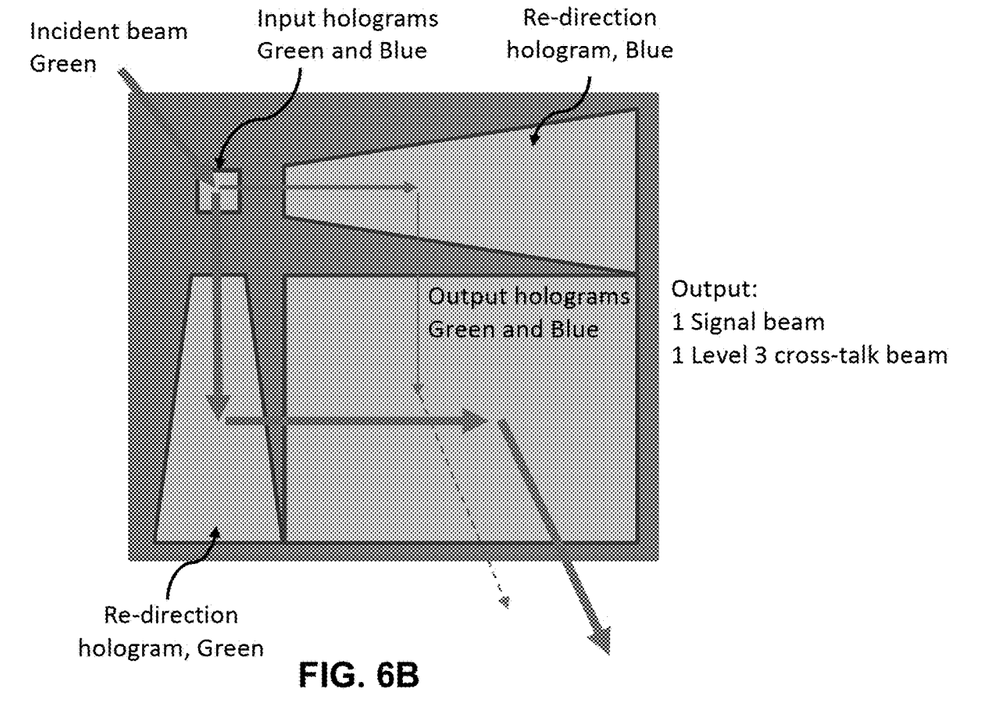
FIG. 6B shows a schematic illustration of how a waveguide of the present invention, with a square-shaped geometry reduces the number of cross-talk beams generated by a two color optical waveguide.

As shown in FIG. 6B, for a waveguide with square-shape design, when the incident green light beam interacts with the input holograms, (one green and one blue input holograms) it will diffract into two beams, one from each hologram. However, the two beams are diffracted with a 90-degree rotation. The beam diffracted by the green input hologram, the signal beam, will propagate toward the green redirection hologram along the first direction (vertical) and the beam diffracted by the blue input hologram, the cross-talk beam, will propagate toward the blue redirection hologram along the second direction (horizontal) and we will refer this beam as a level 1 cross-talk beam.

For a square-shaped design, where the green and blue redirection holograms are separated laterally and located on opposite sides of the input and output holograms by 90-degrees rotation, the two diffracted beams from the input holograms each only interact with only one redirection hologram. The signal beam will interact with the green redirection hologram and will only diffract into one beam toward the output holograms. The level 1 cross-talk beam diffracted from the input hologram will interact with the blue redirection hologram and will only diffract into one beam toward the output hologram now as a level 2 cross-talk beam.

When the two beams from the two redirection holograms interact with the output holograms (one green and one blue output hologram) each diffracts into one beam and results in two beams exiting the output holograms. The single beam from the green redirection hologram will be diffracted only by the green output hologram as the signal beam. The level 2 cross-talk beam from the blue redirection hologram will be diffracted only by the blue output hologram as a level 3 cross-talk beam. The signal beam outcoupled from the output holograms generates the image. The cross-talk beam outcoupled from the output holograms may generate ghost images, artifacts, and noise.

This simple two-color example clearly shows the advantage of the square-shape design compared to the L-shape design in reducing cross-talk by reducing the total number of cross-talk beams outcoupled by the output holograms from 8 beams to 1 beam.

The beam paths (straight arrowed lines) shown in FIG. 5 and FIG. 6 are for illustrative purposes only, they are simplified and do not represent the physical propagation of actual light beams through the waveguide, which are significantly more complex. The length and directions of the arrows representing the beams are not to scale.

Cross-Talk Between Green and Red Colors

The cross-talk between green and red colors is less severe due to larger spectral separation between green and red wavelengths. Nevertheless, the proposed square-shape design will also help reduce the cross-talk between the green and red colors due to the same reasoning described in the green and blue example above.

Cross-Talk Between Red and Blue Colors

In a waveguide using this square-shape design, the red and blue beam paths overlap just like in a waveguide using L-shape design. Therefore, the square-shape design does not reduce the cross-talk between the red and blue colors. However, the spectral separation between the red and blue colors is large enough that the interaction between the red color light with blue holograms and vice versa is generally minimal and has not shown to be a problem.

The redirection holograms of the present invention may be volume phase holograms operating in the Bragg diffraction regime, surface relief gratings operating in the Raman-Nath diffraction regime, or any other suitable redirection holograms.

Variations of the Square-Shaped Design

Figure 7:
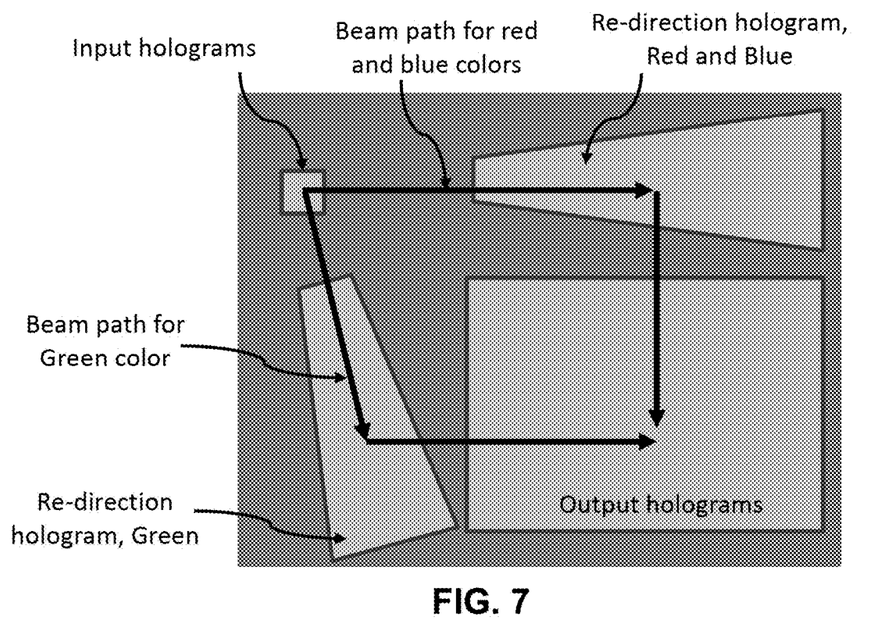
FIG. 7 shows a schematic illustration of a waveguide of the present invention with different beam paths with primary beam paths at an angle other than 90 degrees from each other.
Figure 8:
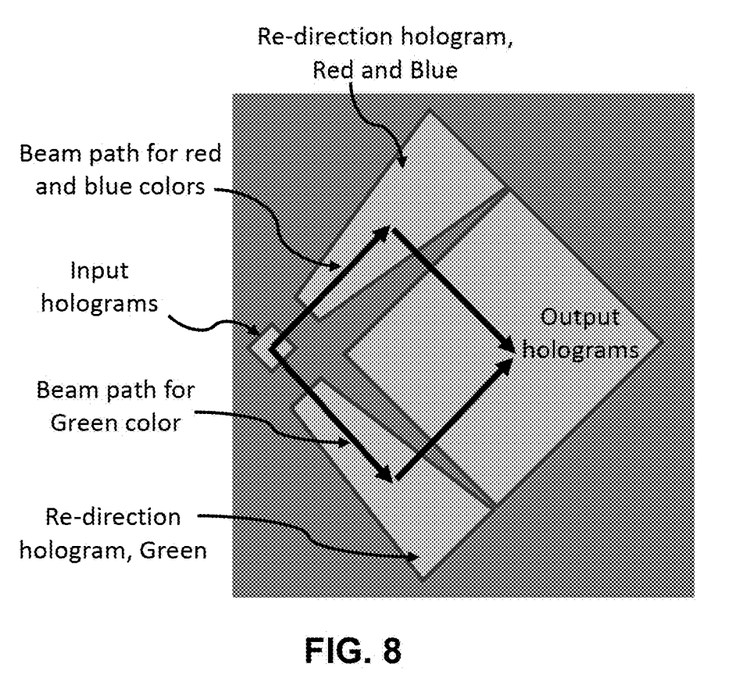
FIG. 8 shows a schematic illustration of a waveguide of the present invention with input, pupil expansion (redirection), and output elements arranged in a waveguide with a diamond geometry.

One central concept behind the square-shaped design of the present invention is the lateral separation of the redirection holograms for the green color and those for the red and blue colors. The square-shaped design where the beam paths for the green color and the red and blue colors are perpendicular (forming a square) as shown in FIG. 4 is one straightforward way to layout the input, redirection, and output holograms. However, the two beam paths may also form other angles propagating from the input holograms or from one or both redirection holograms. FIG. 7 shows a possible layout where the beam path for the green color propagating from green input hologram to green redirection hologram and the beam path for the red and blue color propagating from the red and blue input holograms to red and blue redirection holograms is less than 90 degrees and the two beam paths form a trapezoid-shape. FIG. 8 shows a possible layout where the input, redirection, and output holograms are rotated 45 degrees relative to the design shown in FIG. 4.

Using Non-Overlapping Input Holograms

Figure 9:
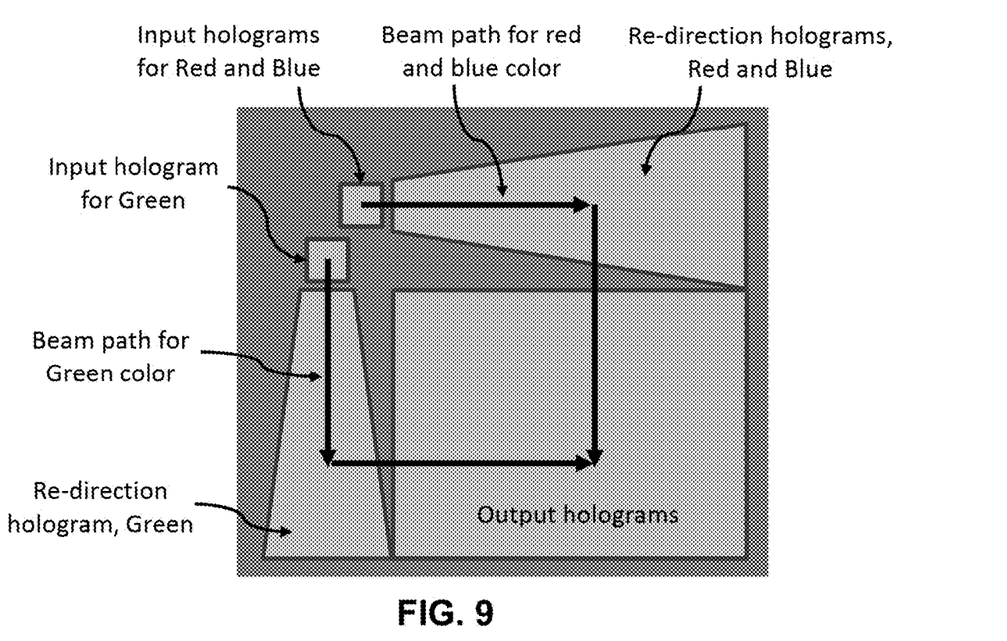
FIG. 9 shows a schematic illustration of a waveguide of the present invention with both overlapping and non-overlapping input optical elements each positioned at a diagonal from the overlapping outcoupling optical elements, near the same corner of the outcoupling optical elements.

Another way to further reduce the cross-talk is to laterally separate the input holograms for the different colors. One possible design is shown in FIG. 9. In this design the green input hologram does not overlap with the blue and red input holograms. Using this design there will not be any cross-talk between green and blue colors.

Figure 10:
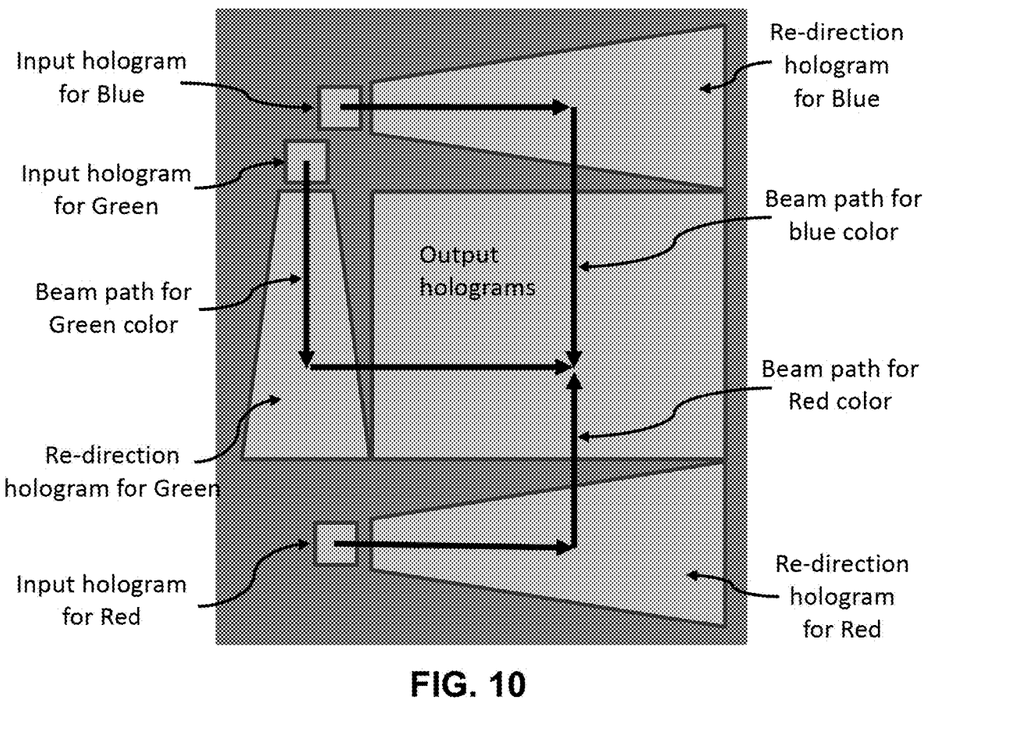
FIG. 10 shows a schematic illustration of a waveguide of the present invention with totally non-overlapping input optical elements each positioned at a diagonal from the overlapping outcoupling optical elements, near the same and different corners of the outcoupling optical elements.
Figure 11:
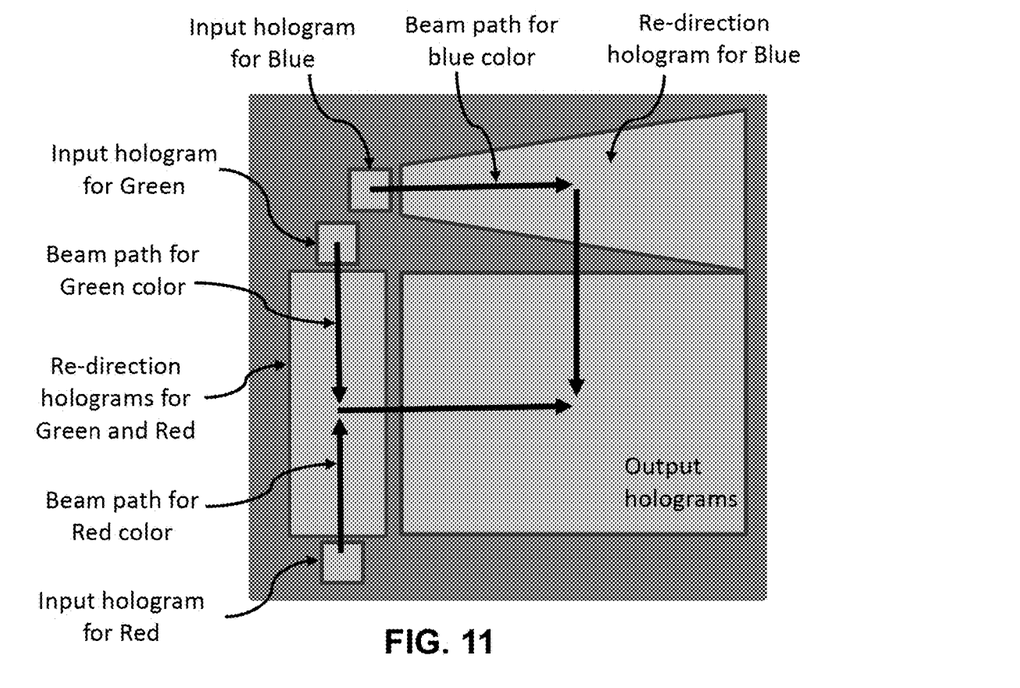
FIG. 11 shows a schematic illustration of a waveguide of the present invention with totally non-overlapping input optical elements each positioned at a diagonal from the overlapping outcoupling optical elements, near the same and different corners of the outcoupling optical elements. The red and green redirection holograms are overlapping, but redirect light propagating from opposite directions.

To push this approach further, one can also completely separate out all three input holograms as well as all three redirection holograms. In this case, the beam path for all three colors is separated and the only overlapping holograms are the output holograms and the diffraction directions are different. One possible design using this approach is shown in FIG. 10. Using three non-overlapping redirection holograms will significantly increase the overall size of the waveguide. Another alternative design is to use three non-overlapping input holograms but overlaps the two of the three redirection holograms, this is shown in FIG. 11.

Using non-overlapping input holograms requires multiple projection optical systems to project different color images into the waveguide. For example, for the design shown in FIG. 10, three projection optical systems are needed. However, using separate projection optical systems for different colors removes the need for chromatic aberration correction and therefore reduces both the design and fabrication complexity of the individual projection optical systems. Not having to correct chromatic aberrations also makes it easier to implement diffractive surfaces or meta surfaces in the projection optical system design that can potentially reduce their size.

Figure 12:
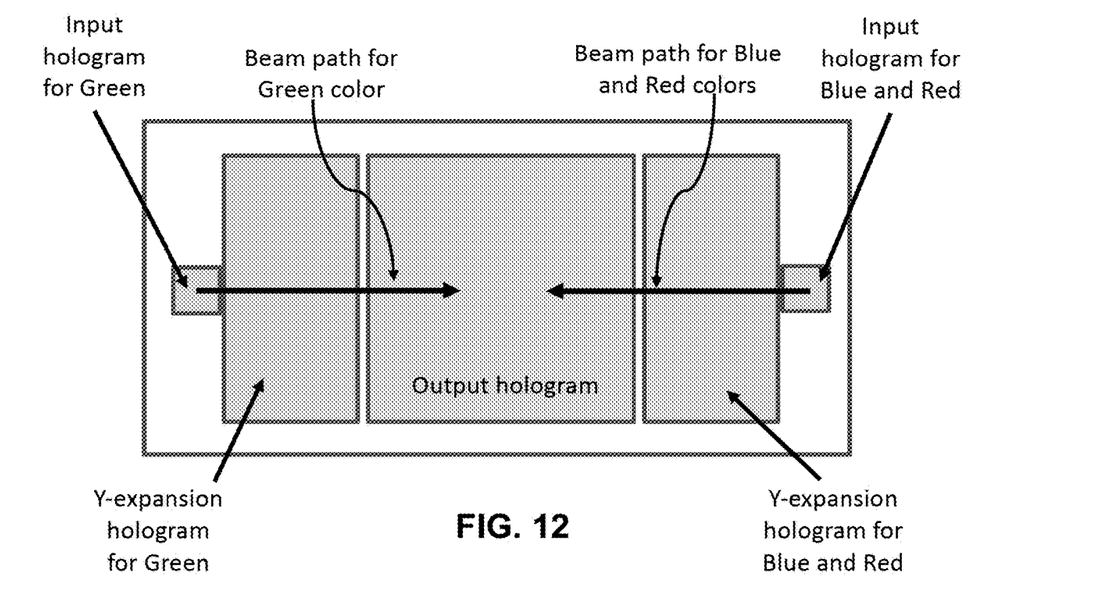
FIG. 12 shows a schematic illustration of a waveguide of the present invention with a symmetric in-line arrangement of input, pupil expansion (redirection), and output elements. The green input hologram is arranged on the opposite side of the output holograms from the blue and red input holograms, such that the green beam propagates in an opposite direction to the blue and red beams.

The concept of separating out the input and first pupil expansion holograms laterally may also be applied to in-line designs, as shown in FIG. 12. In this example, the input and Y-expansion holograms for the green color are located on one side of the output holograms while the input and Y-expansion holograms for blue and red colors are located on a different side of the output holograms.

Figure 13:
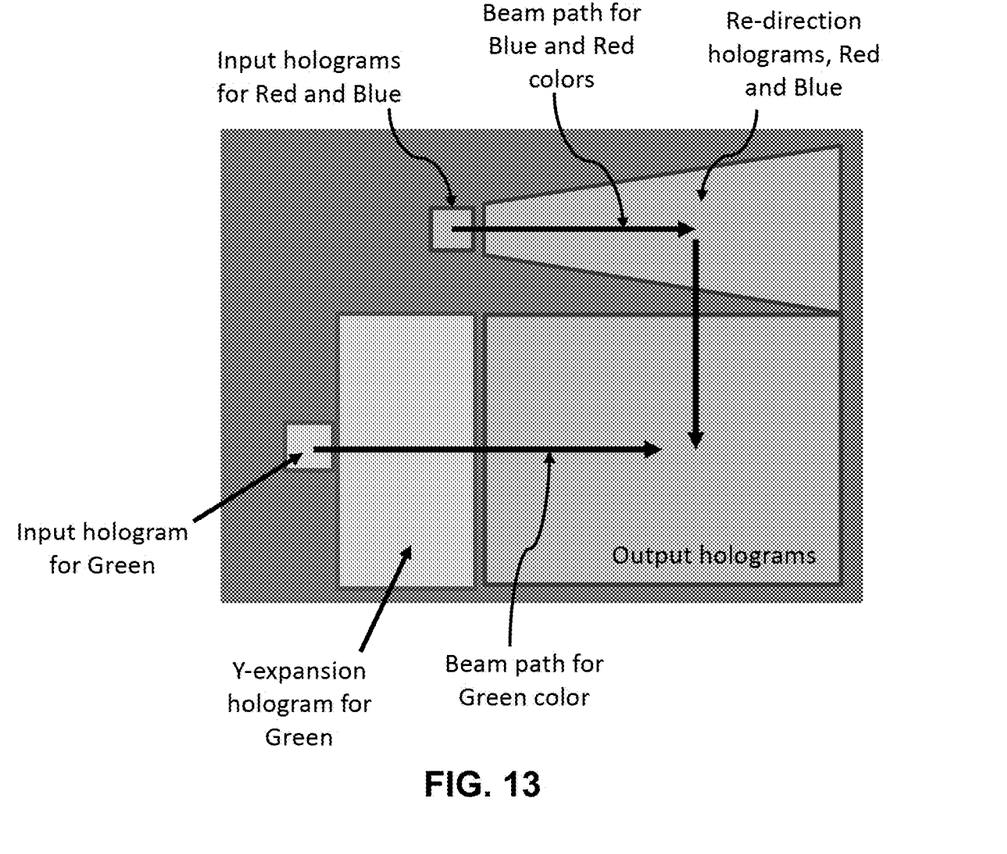
FIG. 13 shows a schematic illustration of a waveguide of the present invention with the green input, pupil expansion, and output elements arranged in an in-line geometry and the red and blue input, pupil expansion (redirection), and output elements arranged in an L-shaped geometry.

Yet another possible strategy is to combine the in-line and L-shaped designs, as shown in FIG. 13. In this case, one of the colors (green in this example) uses the in-line design via one beam path, and the other two colors (blue and red in this example) use the L-shaped design via a second beam path. The two beam paths are separated, and thus minimize cross talk between the green color image and the blue and red color images.

In some embodiments, the present invention features an optical waveguide for combining light from real imagery with light from a light engine, the waveguide comprising: an optically transparent substrate having top and bottom surfaces; and a plurality of optical elements optically coupled with the substrate. The plurality of optical elements may include a plurality of incoupling optical elements, each configured to incouple a light beam into the substrate such that the light beam propagates through the substrate. The incoupling optical elements may all be overlapping, all non-overlapping, or arranged such that some are overlapping and some are non-overlapping. The incoupling optical elements may cause each of the light beams to propagate along a primary beam path.

As used herein, "propagate along a beam path" refers to the path representing the overall or average direction of a light beam as it propagates through a substrate. While the actual pathways traveled by the light beam may be highly complex at a photonic level, the beam path represents the macroscopic direction of propagation, for example, along a horizontal or vertical beam path. An L-shaped overall beam path through the substrate may be represented by a series of two straight beam paths representing both the horizontal and vertical components of the propagation along the overall beam path.

The plurality of optical elements may include a first incoupling optical element configured to incouple a first light beam into the substrate such that the first light beam propagates through the substrate along a first primary beam path, a first outcoupling optical element configured to outcouple the first light beam from the substrate, and a first redirection optical element configured to redirect the first light beam such that it propagates through the substrate toward the first outcoupling optical element along a first secondary beam path.

The plurality of optical elements may also include a second incoupling optical element configured to incouple a second light beam into the substrate such that the second light beam propagates through the substrate along a second primary beam path; a second outcoupling optical element configured to outcouple the second light beam from the substrate; and a second redirection optical element configured to redirect the second light beam such that it propagates through the substrate toward the second outcoupling optical element along a second secondary beam path.

The plurality of optical elements may additionally include a third incoupling optical element configured to incouple a third light beam into the substrate such that the third light beam propagates through the substrate along a third primary beam path; a third outcoupling optical element configured to outcouple the third light beam from the substrate; and a third redirection optical element configured to redirect the third light beam such that it propagates through the substrate toward the third outcoupling optical element along a third secondary beam path. In further embodiments, the plurality of optical elements may include fourth, fifth, sixth, or more sets of optical elements corresponding to additional light beams.

In some embodiments, each of the light beams may correspond to a different color, or range of wavelengths in the electromagnetic spectrum. As a non-limiting example, the first light beam may be red, the second light beam green, and the third light beam blue. Additionally, the light beams may correspond to different angular ranges. As a non-limiting example, a six light beam system may include red, green, and blue light beams with a first angular range, and red, green, and blue light beams with a second angular range.

The optical elements for each light beam may overlap with optical elements for other light beams. The first, second, and third incoupling optical elements may all be overlapping, all non-overlapping, or have two of the three overlapping and one of the three non-overlapping. Similarly, the first, second, and third outcoupling optical elements may all be overlapping, all non-overlapping, or have two of the three overlapping and one of the three non-overlapping. Furthermore, the first, second, and third redirection optical elements may all be overlapping, all non-overlapping, or have two of the three overlapping and one of the three non-overlapping. As a non-limiting example, the first and third redirection optical elements may be overlapping, while the second redirection optical element may be non-overlapping with the first and third redirection optical elements.

Due to the differing orientations of the optical elements the various beam paths may be different. As a non-limiting example, the first and third primary beam paths may both be different from the second primary beam path, and the first and third secondary beam paths may both be different from the second secondary beam path. In some embodiment, selected beam paths may be the same. As a non-limiting example, the first and third primary beam paths may be the same, and the first and third secondary beam paths may be the same. In some embodiments, selected beam paths may be orthogonal. As a non-limiting example, the first and third primary beam paths may both be orthogonal to the second primary beam path, and the first and third secondary beam paths may both be orthogonal to the second secondary beam path.

In some embodiments, each of the plurality of optical elements may be overlaid on the top surface or bottom surface of the optically transparent substrate, or integrated within the optically transparent substrate between the top and bottom surfaces. Some optical elements may be overlaid on the top surface while others are overlaid on the bottom surface. Where optical elements are overlapping, they may be printed in a single film, or in separate stacked films.

As one non-limiting example, an optical waveguide for combining light from real imagery with light from a light engine may include: an optically transparent substrate having top and bottom surfaces; and a plurality of optical elements optically coupled with the substrate. The plurality of optical elements may include: a first incoupling optical element for incoupling a first light beam into the substrate such that the first light beam propagates through the substrate along a first primary beam path; a second incoupling optical element for incoupling a second light beam into the substrate such that the second light beam propagates through the substrate along a second primary beam path; a first outcoupling optical element for outcoupling the first light beam from the substrate; and a second outcoupling optical element for outcoupling the second light beam from the substrate. In selected embodiments, the first and second outcoupling optical elements may be overlapping, and the first primary beam path may be different from the second primary beam path.

In some embodiments, one or more of the primary beam paths may represent the entirety of a beam path between an incoupling optical element and an outcoupling optical element. As a non-limiting example, the first primary beam path may be from the first incoupling optical element to the first outcoupling optical element, and the second primary beam path may be from the second incoupling optical element to the second outcoupling optical element. In other embodiments, one or more of the primary beam paths may represent a segment of a beam path between an incoupling optical element and an outcoupling optical element, such as an L-shaped beam path which is redirected via a redirection optical element. As a non-limiting example, the first primary beam path may be from the first incoupling optical element to a first redirection optical element, and the second primary beam path may be from the second incoupling optical element to a second redirection optical element. Similarly, a first secondary beam path may be from the first redirection optical element to the first outcoupling optical element, and a second secondary beam path may be from the second redirection optical element to the second outcoupling optical element.

In one embodiment, the first and second incoupling optical elements may be positioned on opposite sides of the outcoupling optical elements. (See the non-limiting example of FIG. 12.) In other embodiments, the first and second incoupling optical elements may each be positioned at a diagonal from the outcoupling optical elements. The first and second incoupling optical elements may be overlapping or non-overlapping, and may each be positioned closest to the same corner of the outcoupling optical elements or closest to different corners of the outcoupling optical elements. According to some embodiments, the first incoupling optical element may be positioned at a diagonal from the outcoupling optical elements and the second incoupling optical element may be positioned in-line along a side of the outcoupling optical elements.

In some embodiments, the first primary beam path and the second primary beam path may be at an angle from each other. In selected embodiments, the angle may be 90 degrees. In other embodiments, the angle is more or less than 90 degrees. As non-limiting examples, the angle may be 1-5, 5-10, 10-15, 15-20, 20-25, 25-30, 30-35, 35-40, 40-45, 45-50, 50-55, 55-60, 60-65, 65-70, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, or 175-179 degrees.

In some embodiments, the plurality of optical elements may additionally include: a third incoupling optical element for incoupling a third light beam into the substrate such that the third light beam propagates through the substrate along a third primary beam path; and a third outcoupling optical element for outcoupling the third light beam from the substrate. In one embodiment, the third primary beam path may be from the third incoupling optical element to the third outcoupling optical element. In another embodiment, the third primary beam path may be from the third incoupling optical element to a third redirection optical element. In still another embodiment, a third secondary beam path may be from the third redirection optical element to the third outcoupling optical element. In some embodiments, the third primary beam path may be the same as the first primary beam path, and the third secondary beam path may be the same as the third secondary beam path.

As another non-limiting example, an optical waveguide for combining light from real imagery with light from a light engine may include an optically transparent substrate having top and bottom surfaces; and a plurality of optical elements optically coupled with the substrate; where the plurality of optical elements include: a plurality of incoupling optical elements, a plurality of overlapping outcoupling optical elements, and a plurality of redirection optical elements. Each of the incoupling optical elements may incouple a light beam into the substrate such that the light beam propagates through the substrate along a primary beam path, each of the outcoupling optical elements may outcouple one of the light beams from the substrate; and each of the redirection optical elements, may redirect one of the light beams such that it propagates through the substrate toward the outcoupling optical elements along a secondary beam path. In preferred embodiments, at least two of the primary beam paths may be different from each other, and at least two of the secondary beam paths may be different from each other. In some embodiments, at least two of the incoupling optical elements are non-overlapping. In some embodiments, at least two of the incoupling optical elements are overlapping. In some embodiments, at least two of the redirection optical elements are non-overlapping. In some embodiments, at least two of the redirection optical elements are overlapping.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the

What is claimed is:

1. A waveguide comprising:
   a. an optically transparent substrate having top and bottom surfaces; and
   b. a plurality of optical elements optically coupled with the substrate, the plurality of optical elements comprising:
      i. a first incoupling optical element configured to incouple a first light beam into the substrate such that the first light beam propagates through the substrate along a first primary beam path;
      ii. a first outcoupling optical element configured to outcouple the first light beam from the substrate;
      iii. a first redirection optical element configured to redirect the first light beam such that the first light beam propagates through the substrate toward the first outcoupling optical element along a first secondary beam path;
      iv. a second incoupling optical element configured to incouple a second light beam into the substrate such that the second light beam propagates through the substrate along a second primary beam path;
      v. a second outcoupling optical element configured to outcouple the second light beam from the substrate;
      vi. a second redirection optical element configured to redirect the second light beam such that the second light beam propagates through the substrate toward the second outcoupling optical element along a second secondary beam path;
      vii. a third incoupling optical element configured to incouple a third light beam into the substrate such that the third light beam propagates through the substrate along a third primary beam path;
      viii. a third outcoupling optical element configured to outcouple the third light beam from the substrate; and
      ix. a third redirection optical element that forms a stack with the second redirection optical element and that is configured to redirect the third light beam such that the third light beam propagates through the substrate toward the third outcoupling optical element along a third secondary beam path that is parallel to the second secondary beam path, wherein the third redirection optical element and the second redirection optical element are separate from the first redirection optical element;
   wherein the first, second, and third outcoupling optical elements are overlapping, the first, second, and third incoupling optical elements are non-overlapping,
   wherein at least the first and second outcoupling optical elements form a stack of optical elements, the stack having a first side and a second side that is adjacent to the first side, the first secondary beam path being incident to the first side and the third secondary beam path being incident to the second side, and
   wherein the first secondary beam path intersects with the first side, and the third secondary beam path intersects with the second side.

2. The waveguide of claim 1, wherein the second and third primary beam paths are both orthogonal to the first primary beam path, and the second and third secondary beam paths are both orthogonal to the first secondary beam path.

3. A waveguide comprising:
   a. an optically transparent substrate having top and bottom surfaces; and
   b. a plurality of optical elements optically coupled with the substrate, the plurality of optical elements comprising:
      i. a first incoupling optical element configured to incouple a first light beam into the substrate such that the first light beam propagates through the substrate along a first primary beam path;
      ii. a second incoupling optical element configured to incouple a second light beam into the substrate such that the second light beam propagates through the substrate along a second primary beam path;
      iii. a third incoupling optical element configured to incouple a third light beam into the substrate such that the third light beam propagates through the substrate along a third primary beam path, wherein the first, second, and third incoupling optical elements are non-overlapping;
      iv. a first outcoupling optical element configured to outcouple the first light beam from the substrate;
      v. a second outcoupling optical element configured to outcouple the second light beam from the substrate;
   wherein the first and second outcoupling optical elements are overlapping and form a first stack of optical elements, the first stack having a first side and a second side that is adjacent to the first side, the first stack configured to receive, at a first incidence angle, the first light beam at the first side and to receive, at a second incidence angle, the second light beam at the second side, the first incidence angle and the second incidence angle having a same value, and wherein the first primary beam path is different from the second primary beam path, and
   wherein the first and second incoupling optical elements are non-overlapping;
      vi. a second stack of redirection optical elements configured to redirect the first light beam and the third light beam such that the first light beam propagates through the substrate toward the first stack along a first secondary beam path and such that the third light beam propagates through the substrate toward the first stack along a third secondary beam path parallel to the first secondary beam path; and
      vii. a redirection optical element that is separate from the second stack and that is configured to redirect the second light beam such that the second light beam propagates through the substrate toward the second outcoupling optical element along a second secondary beam path,
   wherein the first secondary beam path intersects with the first side, and the second secondary beam path intersects with the second side.

4. The waveguide of claim 3, wherein the first primary beam path is from the first incoupling optical element to a first redirection optical element of the second stack.

5. The waveguide of claim 4, wherein the second primary beam path is from the second incoupling optical element to the redirection optical element.

6. The waveguide of claim 3, wherein the first incoupling optical element is positioned at a first distance from the first side.

7. The waveguide of claim 3, wherein the first and second incoupling optical elements are each positioned at a diagonal from the first and second outcoupling optical elements.

8. The waveguide of claim 3, wherein the first incoupling optical element is positioned at a diagonal from the first and second outcoupling optical elements.

9. The waveguide of claim 3, wherein the first primary beam path and the second primary beam path are at an angle from each other.

10. The waveguide of claim 9, wherein the angle is 90 degrees.

11. The waveguide of claim 9, wherein the angle is up to 90 degrees.

12. The waveguide of claim 3, wherein the plurality of optical elements additionally comprises:
   a third outcoupling optical element that is included in the first stack and that is configured to outcouple the third light beam from the substrate.

13. The waveguide of claim 12, wherein the third primary beam path is from the third incoupling optical element to the second stack.

14. The waveguide of claim 12, wherein the third primary beam path is from the third incoupling optical element to a third redirection optical element of the second stack.

15. The waveguide of claim 12, wherein the third primary beam path is parallel to the first primary beam path.

16. The waveguide of claim 3, wherein the first stack further comprises a third side different from the first side and the second side.

17. The waveguide of claim 3, wherein the first incoupling optical element is positioned at first distance from the first stack, wherein the second incoupling optical element is positioned at second distance from the first stack.

18. The waveguide of claim 3, wherein the first primary beam path is non-parallel to the first secondary beam path.

19. A waveguide comprising:
   a. an optically transparent substrate having top and bottom surfaces; and
   b. a plurality of optical elements optically coupled with the substrate, the plurality of optical elements comprising:
      i. a first incoupling optical element configured to incouple a first light beam into the substrate such that the first light beam propagates through the substrate along a first primary beam path;
      ii. a second incoupling optical element configured to incouple a second light beam into the substrate such that the second light beam propagates through the substrate along a second primary beam path;
      iii. a third incoupling optical element configured to incouple a third light beam into the substrate such that the third light beam propagates through the substrate along a third primary beam path, wherein the first, second, and third incoupling optical elements are non-overlapping;
      iv. a first outcoupling optical element configured to outcouple the first light beam from the substrate;
      v. a second outcoupling optical element configured to outcouple the second light beam from the substrate;
      wherein the first and second outcoupling optical elements are overlapping and form a first stack of optical elements, the first stack having a first side and a second side that is adjacent to the first side, the first stack configured to receive the first light beam at the first side and to receive the second light beam at the second side, and wherein the first primary beam path is different from the second primary beam path, and wherein the first and second incoupling optical elements are non-overlapping;
      vi. a second stack of redirection optical elements configured to redirect the first light beam and the third light beam such that the first light beam propagates through the substrate toward the first stack along a first secondary beam path and such that the third light beam propagates through the substrate toward the first stack along a third secondary beam path parallel to the first secondary beam path; and
      vii. a redirection optical element that is separate from the second stack and that is configured to redirect the second light beam such that the second light beam propagates through the substrate toward the second outcoupling optical element along a second secondary beam path.

20. The waveguide of claim 19, wherein the first secondary beam path is non-parallel to the second secondary beam path.

* * * * *